United States Patent [19]

Wacyk et al.

[11] 4,450,562
[45] May 22, 1984

[54] TWO LEVEL PARITY ERROR CORRECTION SYSTEM

[75] Inventors: Ihor T. Wacyk, Bridgewater; Roger G. Stewart, Neshanic Station, both of N.J.

[73] Assignee: RCA Corporation, New York, N.Y.

[21] Appl. No.: 362,465

[22] Filed: Mar. 26, 1982

[51] Int. Cl.³ .............................................. G06F 11/10
[52] U.S. Cl. ......................................... 371/51; 371/49
[58] Field of Search .............................. 371/49, 50, 51

[56] References Cited

U.S. PATENT DOCUMENTS

| | | | |
|---|---|---|---|
| 3,972,033 | 7/1976 | Cislaghi et al. | 371/51 X |
| 4,038,537 | 7/1977 | Cassarino, Jr. et al. | 371/51 |
| 4,044,328 | 8/1977 | Herff | 371/50 |
| 4,360,917 | 11/1982 | Sindelar et al. | 371/49 |

Primary Examiner—Charles E. Atkinson
Attorney, Agent, or Firm—Joseph S. Tripoli; George E. Haas; Henry I. Schanzer

[57] ABSTRACT

A memory system comprised of M integrated circuits (IC's) in which M-1 of the IC's store data bits and the Mth IC stores system parity bits. Each IC includes a memory array of cells organized into W internal words of several bits, a parity array for storing a parity bit for each internal word, means for reading-out a selected bit, means for reading the internal word containing the selected bit and ascertaining whether its parity is correct and for producing a first signal indicative thereof. Each IC also includes means responsive to its selected data bit and to an externally generated signal indicative of the parity of the data bit read-out from one or more of the other IC's for producing a signal indicative of the parity of the combined signal. The M IC's may be interconnected to produce a system parity signal at the output of the Mth IC indicative of whether the parity of the M data bits read-out from the M IC's is correct. Each IC also includes means responsive to the system parity signal and to its internally generated first signal indicating the presence of parity errors "correcting" the selected bit outputted from the IC.

10 Claims, 6 Drawing Figures

TWO LEVEL PARITY ERROR CORRECTION SYSTEM

The Government has rights in this invention pursuant to contract No. DAAK 20-79-C-0276 awarded by the Department of the Army.

This invention relates to memory systems and to memory subsystems which include the capability to detect and correct errors.

In many data handling systems several semiconductor integrated circuits (IC's) defined herein as "subsystems" are interconnected to form a memory system. Each IC, or chip, may contain anywhere from 1K to more than 64K bits of information. Hence, each IC or subsystem may be a large scale integrated (LSI) circuit or a very large scale integrated (VLSI) circuit.

The advent of LSI and VLSI circuits has introduced new problems in the areas of reliability and testability at the subsystem level. The resulting smaller nodal capacitances renders the memory cells more susceptible to data upset by noise and radiation effects. Also, due to the smaller memory cells and larger bit line capacitances, smaller bit line signal swings are produced increasing the possibility or errors in reading (sensing) the stored information or in writing the desired information. Consequently, the probability of errors is significantly increased due to the large (and ever increasing) number of cells in each IC (i.e. subsystem) and to the increased number of sources of error. The probability of errors is compounded when several of these subsystems are combined to form a memory system.

The reliability of the memory system may be improved by using known error detection and correction circuitry. For example, large main frame computer systems may make use of Hamming or other high order error detecting and correcting codes to produce reliable and testable memory systems. However, the use of such codes is not efficient in medium sized memory systems because they add significantly to the memory overhead and to the circuit complexity, and limit and speed of operation of the memory systems. An object of the present invention is to provide fault detection and error correction circuitry suitable for a memory system, which does not add very much to the overhead and to the circuit complexity.

An IC embodying the invention contains a memory array whose bits are organized into groups called "internal" words and a parity array which stores a parity bit corresponding to the parity of each internal word. For example, an IC containing a 16,384 bit memory array is organized into 512 internal words of 32 bits each and is designed to have a parity array of 512 bits, one parity bit per internal word. The IC includes means for selecting and reading-out to an IC output terminal a particular data bit and means for concurrently reading the internal word containing the particular bit and checking the parity of the selected internal word to its corresponding stored parity bit to produce a first level parity signal. The IC includes means responsive to the particular data bit produced internally of the IC and to an externally produced parity signal applied to the IC for combining the particular data bit and the parity signal to produce an output signal indicative of the parity of the combination. This enables several IC's to be combined to produce a parity signal which is indicative of the parity of the combined data bit outputs of the several chips. The IC may also include means responsive to an externally produced error signal applied to the IC and to the first level parity signal for producing a control signal having one value if the error signal and the first level signal indicate the presence of errors and having another value if only one or none of the error signal and the first level signal indicate the presence of an error.

Invention resides in the partitioning and organization of the integrated circuit. That is, each IC may be operated as a stand alone part functioning as a RAM with internal first level error detection. In addition, each IC includes sufficient additional circuitry so that several IC's may be combined to form a large memory system which includes a second level of error detection, with each IC including means responsive to the detection of first and second level errors to correct a single error.

Invention also resides in the interconnection of several IC's of the type discussed above to form a large memory system. A memory system embodying the invention includes M IC's, where each IC includes a RAM portion organized into "W" internal words of "L" bits and a parity section containing one parity bit per internal word. Each IC includes means for generating a first level signal indicating whether the parity of a selected internal word matches its stored parity signal. Furthermore, each IC includes means for selecting a "raw" data bit out of a selected internal word. M-1 of the IC's are used for actual memory storage and the Mth IC is used for system parity storage. The data bits stored in corresponding locations of the M-1 memory storage ICs define a particular system data word of (M-1) bits. During a write cycle the parity of each system data word is generated and stored in a corresponding location in the Mth IC. During a read operation, a "raw" data bit is read-out from corresponding locations of each of the M-1 memory storage IC's and the parity of the resultant M-1 data bits is compared to the corresponding parity bit stored in the system parity storage (Mth) IC to produce a second, system, level parity signal. The system parity signal is applied to each of the (M-1) IC's and compared with the first level parity signal of that IC. If the first level parity signal and the system parity signal in an IC indicate the presence of errors the "raw" data bit from that IC is corrected (i.e. inverted). If only one (or none) of the first and system parity signals in the IC indicate the existence of an error then it is assumed that the "raw" data bit output from that IC is not in error (although the internal word, or the system data word from which that data bit is obtained may contain an error). The subsystem (first level) and system (second level) parity signals are thus used for two level error detection and single error correction. This approach offers low memory overhead, flexibility, simplicity and very little limitation on speed of operation due to the simplicity of the parity checking mechanism.

In the accompanying drawing like reference characters denote like components.

Figure 1:
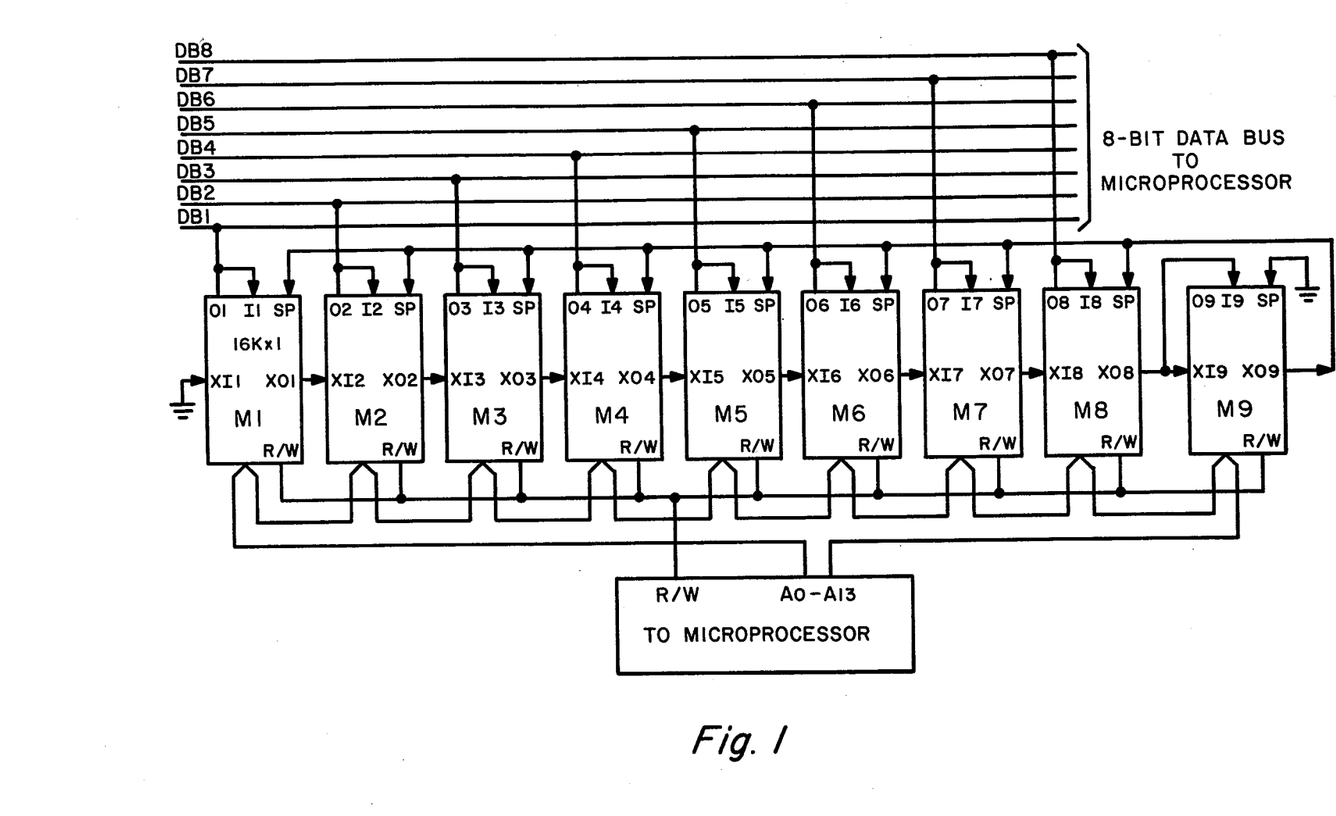
FIG. 1 is a block diagram of a system embodying the invention.

FIG. 1 is a block diagram of a fault tolerant 16K×8 (actually 16,384×8) memory system comprised of 8 memory chips (M1 through M8) and a "system parity" memory chip M9. The 9 chips (M1–M9) are identical to each other. Each chip (Mi) includes: a data input (Ii) pin for the application of input data to be written into and stored by the memory chip; a data output (Oi) pin at which is produced or read-out a selected and, if necessary, "corrected" data bit stored within the memory; an (XIi) input pin for the application to the chip of a signal XO(i-1) indicative of the parity of the data bit(s) of the preceding (i.e. lower numbered) chip(s); an (XOi) output pin at which is produced a signal indicative of the parity of the "raw" data bit of the chip in combination with the parity of the data bits of all preceding chips; a system parity (SP) input pin to which is applied a system parity signal indicating whether or not a "system" parity error exists. [The reference character i is a variable corresponding to the number of the chip.] Each chip also includes a read/write (R/W) control pin whose applied signal determines whether a read or a write operation is to occur; and 14 address inputs (i.e. $A_0$ through $A_{13}$) to enable the ultimate selection (or addressing) of a single bit location out of the 16,384 possible bit locations. The system parity signal is generated by comparing the parity of the 8 "raw" data bits read-out of chips M1 through M1 with a corresponding parity bit stored in system parity chip M9. To simplify the illustration, certain pins (e.g. $V_{DD}$, ground) although present on each chip and needed for its operation are not shown.

In the system of FIG. 1, the output (Oi) pin of each of chips M1 through M8 is connected to its Input (Ii) pin and to a corresponding data bit (DBi) line. The data bit lines, DB1 through DB8, form an 8 bit data bus which couples the memory system to a microprocessor (not shown). Except for the last chip, the XOi output of chip Mi is connected to the XI(i+1) input of chip M(i+1). The XI1 input of chip M1 is grounded ("0" level input). The XI9 input of chip M9 is connected to its input (I9) pin. The output (O9) pin of M9 is not connected to any data bus. The XO9 output of chip M9 is connected to the SP input of chips M1 through M8. The SP input of M9 is grounded ("0" level input). The significance of the simple connection of the XO pin of one chip to the XI pin of the next chip, referred to herein as a "daisy chain" interconnection, to produce a system parity signal is discussed below.

Figure 2A:
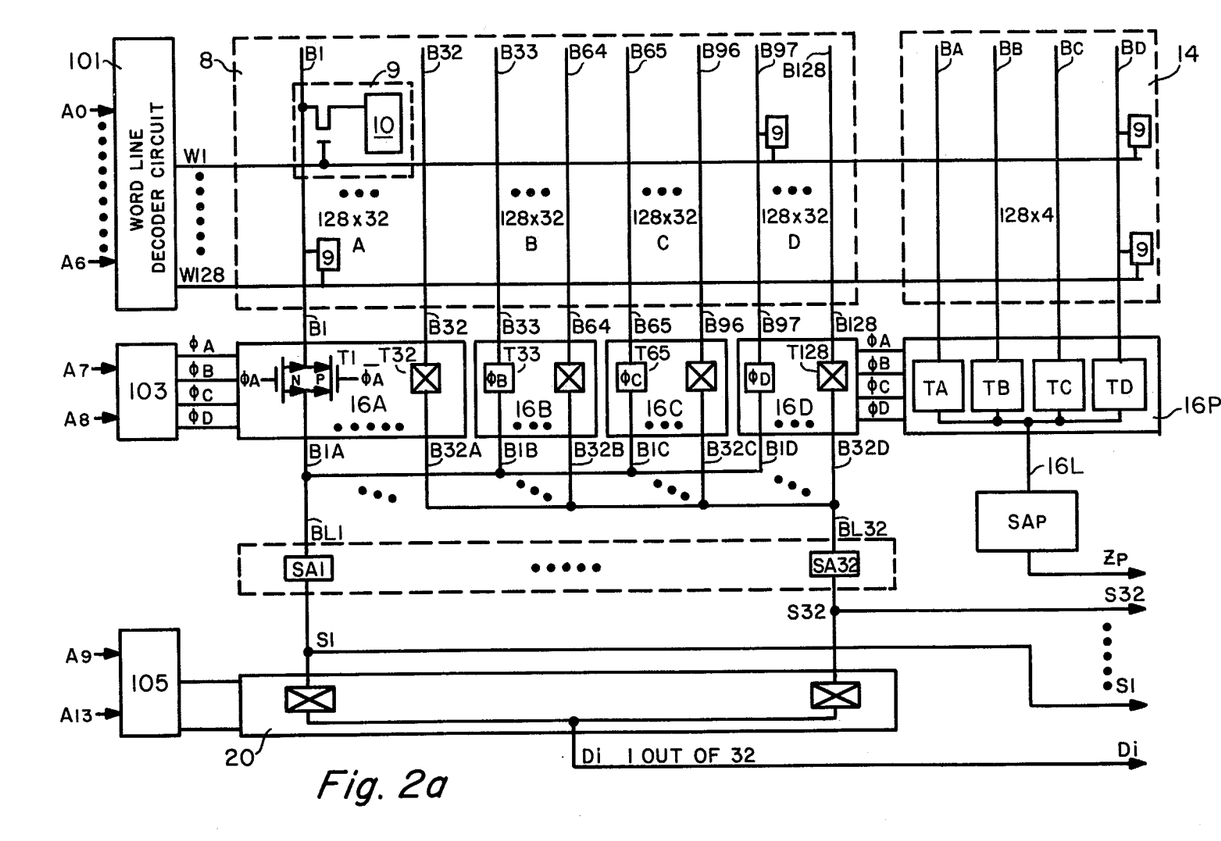
FIGS. 2A, 2B and 2C are diagrams of portions of a subsystem embodying the invention.
Figure 2B:
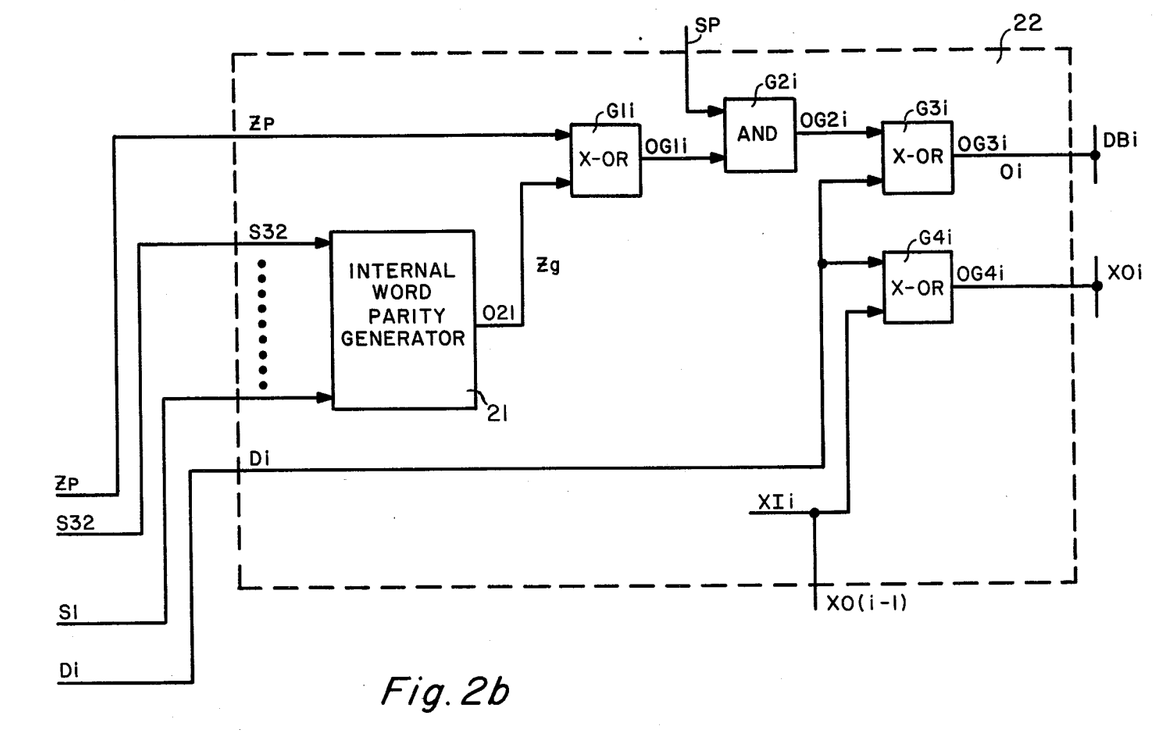
Figure 2C:
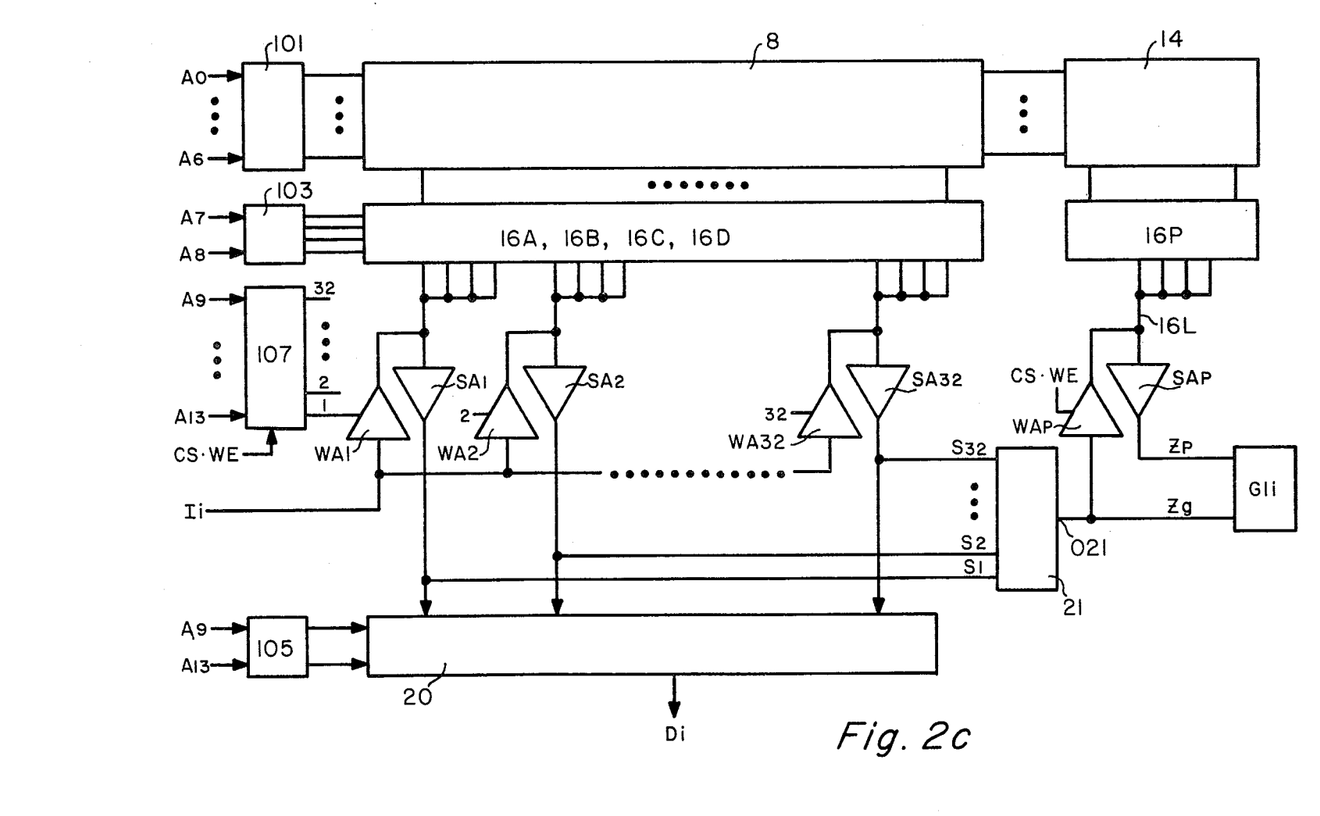

The operation of the system of FIG. 1, as well as some significant features in the construction and partitioning of the chips to form a memory system having a two level parity error-correction code is best understood by first examining FIGS. 2A, 2B, and 2C which detail part of the contents of each one of the chips M1 through M9.

Figure 3:
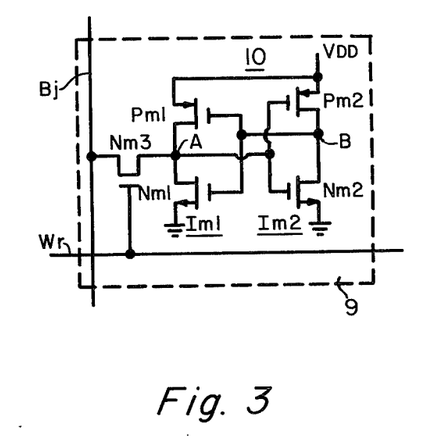
FIG. 3 is a schematic diagram of a memory cell which can be used to practice the invention.

As shown in FIGS. 2A, 2B and 2C, each Integrated Circuit (or chip) M1 through M9 includes:

(1) A Random Access Memory (RAM) array 8 comprised of 16,384 memory cells 9 arranged in 128 rows (words) and 128 columns (bits). There is a word line (Wr) per row of cells and a bit conductor (Bj) per column of cells. Each row of array 8 is partitioned into 4 "internal" words or sections, respectively designated A, B, C, and D, of 32 bits (columns). So organized, array 8 is effectively partitioned into 512 (i.e. 128×4) "internal" words of 32 bits each. In array 8, each memory cell 9, as shown in FIG. 3 includes a gating transistor Nm3 whose conduction path is connected between a bit conductor (Bj) and the Input-Output (I/O) point (A) of a flip-flop 10 comprised of two cross coupled complementary inverters Im1 and Im2. Each inverter includes two IGFETs of complementary conductivity type having their source drains paths connected in series between $V_{DD}$ and ground. The drains of IGFETs Pm1 and Nm1 forming inverter Im1, are connected in common with the gates of IGFETs Pm2 and Nm2 to I/O point A also defined as the "exterior" node of the cell. The drains of Pm2 and Nm2, forming inverter I2, are connected to the gates of Pm1 and Nm1 at node B also defined as the "interior" node of the cell. A word line (Wr) is connected to the control (gate) electrodes of all the Nm3 transistors of a row. A potential applied to the word line controls the conductivity of Nm3. The drain/source electrodes of all the Nm3 transistors in a column are connected to the bit conductor (Bj) of the column. Cell 9 is a static cell but it should be evident that a dynamic cell or an electrically alterable cell could be used instead.

(2) A parity array 14 having 512 bit locations at which are found memory or storage elements which may be of the same type as those in array 8 or which may be any other suitable data storage devices. Each bit location of array 14 stores a parity bit corresponding to an "internal" 32-bit word of array 8. Array 14 is arranged in 128 rows and 4 column, the elements of each row of array 14 being connected to a row (word line) conductor connected to a corresponding word line conductor of array 8, and the elements of each column of elements being connected to a colunn (bit) conductor, $B_A$, $B_B$, $B_C$, and $B_D$. Each bit conductor of array 14 corresponds to a like lettered section in array 8.

(3) A word line decoder 101 to which 7 address bits ($A_0$ to $A_6$) are applied produces 128 different addresses coupled to the row conductors of arrays 8 and 14. Each of the 128 addresses corresponds to a different row and in response to each different address decoder 101 enables a different row, of the 128 rows of arrays 8 and 14.

(4) An internal word and parity bit selector 16, comprised of sections 16A, 16B, 16C, 16D, and 16P is, coupled to arrays 8 and 14 for selecting a particular "internal" word and its corresponding parity bit. Selector 16 is controlled by an internal word predecoder 103 to which two (2) address bits ($A_7$ and $A_8$) are applied. These two bits determine which one of the four sections (i.e. which group of 32 bits) of array 8 and which column conductor of array 14 are respectively coupled to the thirty-two bit lines (BLj) and to the parity line 16L. Selector 16 includes one transmission gate per bit conductor in arrays 8 and 14. Selector 16 is partitioned so that corresponding to each section (A, B, C, D) of array 8 there is a corresponding section (16A, 16B, 16C and 16D). Under the control of address bits $A_7$ and $A_8$ and decoder 103 only one of sections A, B, C, and D is turned-on at any one time, whereby only 32 (one section) of the 128 bit conductors of array 8 are coupled, at any one time, via transmission gates to the 32 bit lines (BL1 through BL32). Similarly, the 4 bit conductors of parity array 14 are multiplexed via corresponding transmission gates $T_A$, $T_B$, $T_C$ and $T_D$ in section 16P onto parity line 16L. Only one of $T_A$, $T_B$, $T_C$ and $T_D$ is turned-on at any one time, being turned-on only when its correspoding like lettered group 16A, 16B, 16C or 16D is turned-on. The signal on line 16L is applied via an amplifier SAP to on input of a two-input Exclusive-OR gate G1i. Thus, when a 32 bit word is read-out of array 8 onto bit lines BL1 through BL32, a parity bit (Zp) stored in array 14 corresponding to that word is read-out onto line 16L and applied to gate G1i.

(5) 32 sense amplifiers and latches (SAj) coupled to the bit lines for amplifying the 32 bits of a selected "internal" 32 bit word. The signals on bit lines BLj are amplified by their corresponding sense amplifiers SAj to produce well defined binary levels at their Sj outputs. That is, either a "low" level is produced, where the low level is a voltage at or close to ground potential which is arbitrarily defined as logic "0" or "0;" or a "high" level is produced, where the high level is a voltage at or close to $V_{DD}$ volts which is arbitrarily defined as logic "1" or "1," and where $V_{DD}$ is assumed positive with respect to ground.

(6) A bit decoder 20 is coupled between the Sj outputs and a data bit output for selecting a single "raw" data bit out of a selected "internal" 32-bit word and producing the "raw" data bit output (Di). Output Di is denoted herein as "raw" because it is coupled to error correction circuitry (G3i) before being applied to the chip output (Oi) from which it is coupled via its data bus (DBi) to a a microprocessor (not shown) or other data handling systems "external" to the memory chip.

(7) A bit predecoder 105 to which are applied 5 address bits ($A_9$ to $A_{13}$) is coupled to decoder 20 and controls bit decoder 20 to select a particular data bit out of the 32 bit "internal" word.

(8) A logic section 22 for parity generation, error detection, and error correction, as shown in FIG. 2B. Logic section 22 includes a parity generator 21 having 32 inputs to which are applied the 32 Sj signals. Therefore the 32 bits of a selected internal word are applied, after amplification, to generator 21 which has an output (021) at which is produced a signal Zg which represents the parity of the 32 bit "internal" word. The output Zg of generator 21 and the corresponding parity bit Zp derived from the output of the internal word parity selector 16P are applied to the two inputs of gate G1i. The elements 21 and X-OR gate G1i together comprise a parity checker. The output (OG1i) of G1i and the system error indicator (SP) signal are applied to the two inputs of an AND gate G2i. The output (OG2i) of gate G2i and the "raw" Di output are applied to the inputs of a two-input Exclusive-OR gate G3i whose output (Oi) is the "corrected" chip output applied to the corresponding data bus (DBi) line. The raw Di output and the XIi input signal [i.e. where XIi is the XO(i-1) output of a preceding chip] are applied to the two inputs of an Exclusive-OR gate G4i to produce a signal (XOi) which indicates the parity of the combination of XIi and Di. As discussed below, this circuitry may be used to generate a parity indication of the combination of all the raw data bits of the combined subsystems.

Circuitry needed to write information into memory 8 and parity array 14 is shown separately in FIG. 2C to simplify the drawings.

Referring to FIG. 2C, when a new data bit Ii is to be written into the memory 8 a decoder 107 is first energized in respone to the logical product of a chip select (CS) and write enable (WE) signal (indicated by the AND function CS·WE legend on the input line). The logical signal may be supplied from a microprocessor or other source (not shown). Decoder 107 has 5 address bit inputs (A9 through A13) and 32 outputs. Each one of the 32 outputs is connected to a different write amplifier (WAj). The write amplifiers are connected at their inputs to an input signal line and at their outputs to a bit line BLj. They are, preferably, low output impedance tri-state devices capable of overriding and overwriting the information on their associated bit lines. In response to a particular combination of the 5 address bits A9 through A13 applies to its inputs decoder 107 enables one of the write amplifiers.

It should be noted that during a write cycle (in fact, just before a new bit is actually written into a memory location), a read is performed. That is, an internal word corresponding to addresses $A_0$ through $A_6$ and $A_7$ through $A_8$ is read-out onto the bit lines (BLj). The selected write amplifier, in response to Ii, writes over the information read-out on its associated bit line. The information on the 32 bit lines thus includes 31 old bits of information and one new bit of information.

Consequently, when a new data bit is being written into a chip, the data bit being written becomes part of an "internal" word. The "new" internal word is coupled via the SAj amplifiers to parity generator 21. A new parity bit corresponding to the parity of the "new" internal word is generated at the output 021 of parity generator 21, which is the same parity generator 21, used during the read cycle. The "new" parity bit Zg at the input of generator 21 is applied via a write amplifier WAp onto line 16L and is then written and stored in a given location of parity array 14 corresponding to the location of the selected internal word. Note that WAp is controlled by the logical product CS·WE signal (the same signal as applied to decoder 107), whereby WAp is on regardless of which WAj amplifier is selected by decoder 107.

Concurrently with the writing of a data bit Ii into chip Mi (FIG. 1), the information on the other 7 data bus lines (DB) will be similarly written (if new) or re-written (if old) in the corresponding bit locations of their arrays. [During a write cycle Ii=Di=Oi.] Hence a "new" system data word will be written into the memory system.

When a "new" system data word is written into the memory system, a system parity bit corresponding to the system data word is generated and stored in a given location of memory M9. By way of example, the 8 bit data word (D1 through D8) appearing on the 8 bit data bus line (DB1 through DB8) is applied to the corresponding inputs (Ii) of the 8 memory storage chips (M1–M8), all of which are energized by chip select and write enable signals. Since the same addresses are applied to all the chips of the system the 8 bits of the system data word are written into corresponding bit locations of memory chips M1 through M8. The parity of the 8 bits of the system data word is generated (using gates G4i of each chip as shown in FIG. 4) and written into a corresponding bit location of system parity chip M9.

Figure 4:
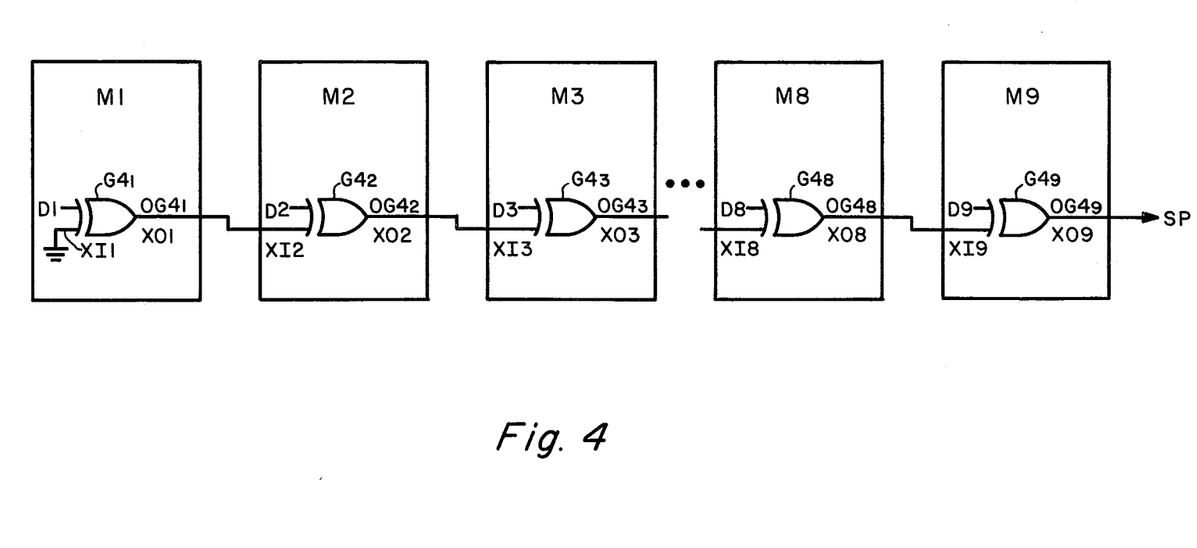
FIG. 4 is a diagram of a portion of the system of FIG. 1 detailing a "daisy chain arrangement."

For the configuration of FIGS. 1 and 4, the output OG48 will be a "0" if there are an even number of "1's" in the "new" system data word I1 (D1) through I8 (D8) and OG48 will be a "1" if there are an odd number of "1's" in the "new" word. Since X08 is equal to I9 and I9 is equal to D9 the parity bit D9 written into M9 in a location corresponding to that of the new system data word, will have the same binary value (i.e. match) as the output OG48 of chip M8.

As discussed above, it is assumed that the RAM array 8 of each chip is organized into internal words, each having a length of 32 bits and that corresponding to each internal word there is a parity bit stored in array 14. Whenever a particular data bit location is addressed and its bit is to be read-out, the 32 bit internal word in which the particular data bit is contained is read-out and is applied to the inputs of a parity generator 21. The output Zg of the parity generator 21 indicative of the parity of the internal word is applied to X-OR gate G1i. The parity bit Zp stored in array 14 corresponding to the 32 bit internal word is also read-out and is applied to the other input of gate G1i.

Concurrently, the 32-bit internal word is further decoded in decoder 20 to produce at the output of 20 the particular "raw" data bit (Di) corresponding to the 14 address bits applied to the system. The output, OG1i, of G1i indicates whether there is a match between the parity of the 32 bit internal word and its corresponding parity bit. As shown in table 1 below, if OG1i is a logic "zero," a match is indicated and there is no error in the "internal" 32-bit word read-out of the memory. That is, the word read-out on lines S1 through S32 has the same parity as the word previously written into the 32 bit locations. If OG1i is a "1," it indicates that an error exists when the parity of the "internal" word read-out of array 8 is compared with its corresponding parity. OG1i indicates the status of the parity of the "internal" word at the chip or subsystem level. Therefore OG1i functions as an error flag indicating whether an error exists in one of 33 bits, where the 33 bits include the 32 bits of the "internal" word read-out and its corresponding parity bit.

TABLE 1

| $Z_g$ | $Z_p$ | OG1i | |
|---|---|---|---|
| 0 | 0 | 0 | Match - No Error |
| 1 | 0 | 1 | Error |
| 0 | 1 | 1 | Error |
| 1 | 1 | 0 | Match - No Error |

OG1i and a system error indicator signal (SP)—whose generation is described below—are applied to AND gate G2i. When SP is high ("1") it indicates that the parity of the 8 "raw" data bits (D1 through D8) read-out from M1 through M8 does not match the parity (D9) of the data word stored in M9 (i.e. there is an error at the "system" level). When SP is low ("0") the parity of the 8 "raw" data bits read-out from M1 through M8 matches the parity of the data-word stored in M9. Therefore, output OG2i of G2i indicates whether or not there exists a system error and a subsystem error as set forth in Table 2 below.

TABLE 2

| Subsystem Parity - OG1i | System Parity - (SP) | OG2i |
|---|---|---|
| "1" - (Subsystem Error) | "1" - (System Error) | "1" System and Subsystem Error |
| "1" - (Subsystem Error) | "0" - (No System Error) | 0 |
| "0" - (No Subsystem Error) | "1" - (System Error) | 0 |
| "0" - (No Subsystem Error) | "0" - (No System Error) | 0 |

When OG2i is high ("1") it indicates that a system error exists and that a subsystem error exists. The error in a 32 bit internal word indicated by OG1i being high is narrowed down or localized to a particular data bit since SP is also high. This conclusion is based on the assumption that there is only a single error in an internal word and/or a single error in a data-word. Since the particular error bit has been located its correction can be effectuated as described below.

When OG1i is high and SP is low, there is an error in an internal 32-bit word read-out of the chip but there is no error in the particular data bit Di being read-out of that chip. Likewise when OG1i is low and SP is high, there is an error at the system level but the particular 32-bit "internal" word read-out of the chip (or subsystem) is not in error.

Returning to the condition when OG2i is high, since a particular error bit has been located it can be corrected. This is achieved by applying Di and OG2i to the two inputs of Exclusive-OR gate G3i to produce an output Oi. As noted in Table 3 below, when OG2i is high Oi is made the inverse of Di. Therefore, a single error in the system is corrected. That is, Oi becomes the corrected version of Di. When OG2i is low, Oi is equal to Di. That is, the binary value of the data bit Di at the output of decoder 20 is applied to its corresponding data bus (DBi).

TABLE 3

| Di | OG2i | Oi | |
|---|---|---|---|
| 0 | 1 | 1 | $Oi = \overline{Di}$ |
| 1 | 1 | 0 | |
| 0 | 0 | 0 | $Oi = Di$ |
| 1 | 0 | 1 | |

The generation of the system parity signal (SP) is best explained by reference to FIG. 4 which shows the "daisy-chain" interconnection of the Exclusive-OR gates G4i located on each chip. Each gate G4i has two-inputs Di and XIi; where Di is the raw data bit read-out of the chip and XIi is the XO(i−1) output of the preceding chip [except for the first chip (M1) of the system]. So connected the XOi output of each chip indicates the parity of the data bit (Di) of the present chip combined with the raw data bit(s) outputted from preceding chips. Thus, during a read cycle the output OG48 (XO8) from G48 will be "low" if there is an even number of "one's" in the data word (D1 through D8) and OG48 will be "high" if there is an odd number of "one's" in the data word. Recall, that during a write cycle the parity of the data word written into a particular bit location in each of the 8 memory chips (M1–M8) is sensed and a parity bit equal (of same binary value) to the parity of the 8 data bits is generated and stored in a corresponding bit location of system parity chip M9. Thus, during a read cycle the output OG48 (XO8) should match the output D9 from M9 and the XO9 output from G39 also designated as the SP signal should be a logic "zero," if there is no error in the data word (D1 through D8) and/or D9. Lack of match between XO8 and D9 (indicative of an error in the data word and/or the stored system parity bit) results in the SP signal being a "1" or high level. Thus, as mentioned above, the SP signal functions as the second level parity error detector, and may be used to correct errors.

As discussed above, the output XO9 of G49 is applied simultaneously to the system parity input (SP) of the main memory chips M1 through M8. The coincidence of a second-level parity error signal with an internal (subsystem) parity error signal results in the correction of the faulty data bit being generated in the offending subsystem. As noted above, the correction occurs by means of logic gates G1i, G2i, and G3i.

The "daisy chain" interconnection scheme, whereby the XOi output from chip Mi is fed to the XI(i+1) input of chip M(i+1), enables each chip to be identical to the other and enables the complete integration of the fault detection and correction function on each chip. Although a delay that is proportional to the number of bits in a data bit word will occur through the serial connection of gates G4i it is not overly significant for 8 and 16 bit words. The benefits of eliminating peripheral devices and simplifying circuit board wiring outweigh the speed penalty Moreover, the system user retains the option of connecting the XOi outputs from each chip in parallel, or some optimum serial-parallel combination, to a parity generator chip in order to minimize the delay for very wide words.

What is claimed is:

1. An integrated circuit (chip) suitable for use in a memory system comprising:

a random access memory (RAM) array having R·C bit locations arranged in R rows and C colums, said RAM being organized into W "internal" words of L bits each; where W·L is equal to R·C and where R, C, W and L are digits greater than 1;

a parity array section of W bits for storing a parity bit for each one of said W "internal" words;

decoding means coupled to said RAM for selectively reading one of said "internal" words and for selectively reading-out a particular data bit (D) out of the L bits of said selected one of said "internal" words;

parity checking means responsive to the parity of the L bits of a selected internal word and to its associated parity bit for producing a first parity signal having a first value to indicate the presence of a parity error and having a second value to indicate the absence of a parity error;

a control terminal for the application thereto of a system parity signal, produced externally to the chip, having either a first value indicative of a system error or a second value indicating the absence of a system error; and first logic means coupled to said control terminal and to said parity checking means responsive to said system parity signal and to said first parity signal for producing at its output a control signal having one binary value in response to said first parity signal and said system parity signal indicating the presence of errors and having the other binary value when only one or none of said first parity and system parity signals indicate the presence of an error.

2. The integrated circuit as claimed in claim 1 further including:

a second logic means, coupled to the output of said first logic means and to said decoding means, responsive to said control signal and to said particular data bit (D) for producing at its output a "corrected" data output signal which is the logical inverse of said data bit (D) when said control signal has said one binary value and which has the same binary value as said data bit when said control signal has said other binary value.

3. The integrated circuit as claimed in claim 2 further including:

means for selectively producing a signal indicative of the parity of said particular data bit in combination with another signal produced externally to the chip comprising:

a signal input terminal for the application thereto of said another signal; and a third logic means responsive to said selected data bit and to said another signal at said signal input terminal for producing an output signal indicative of the parity of the two signals.

4. An integrated circuit (chip) suitable for use in a memory system comprising:

a random access memory (RAM) array having R·C bit locations arranged in R rows and C columns, said RAM being organized into W "internal" words of L bits each; where W·L is equal to R·C and where R, C, W and L are digits greater than 1;

a parity array section of W bits for storing a parity bit corresponding to each one of said W "internal" words;

decoding means coupled to said RAM for selectively reading one of said "internal" word and for selectively reading-out a particular subset of the L bits of said selected one of said "internal" words;

parity checking means, coupled to said decoding means and to said parity array, responsive to the parity of the L bits of the selected internal word and to the parity bit for said selected internal word, for producing a first level parity signal having a first value to indicate the absence of a match (error) between the parity of the L bits and the stored parity bit and having a second value to indicate the presence of a match (no error); and means for selectively producing a signal indicative of the parity of said particular subset of bits in combination with another signal produced externally to the chip comprising:

a signal input terminal for the application thereto of said another signal; and a logic means responsive to said particular subset of bits and to said another signal at said signal input terminal for producing an output signal indicative of the parity of the signals.

5. A memory system comprising:

M integrated circuits, where M is an integer greater than 2, each one of said M integrated circuits containing:

(a) a random access memory (RAM) array having R·C bit locations arranged in R rows and C columns, said RAM being organized into W "internal" words of L bits each; where W·L is equal to R·C and where R, C, W and L are digits greater than 1;

(b) a parity array section of W bits for storing a parity bit for each one of said W "internal" words;

(c) decoding means coupled to said RAM of selectively reading one of said "internal" words and for selectively reading-out a particular data bit (D) out of the L bits of said selected one of said "internal" words;

(d) parity checking means coupled to said decoding means and to said parity array, responsive to the parity of the L bits of a selected internal word and to the parity bit for said selected internal word for generating a first level parity signal indicating whether or not a match exists between said internal word and its corresponding parity bit;

(e) a logic gate having two inputs and an output and responsive to the signals at its inputs for producing a first valued output if the two inputs have the same binary value and a second valued output if the two inputs have different binary values; and (f) means for applying said particular data bit (D) to one of the two inputs of said logic gate;

M−1 of said M integrated circuits storing data bits at their respective bit locations, and the Mth integrated circuit storing at each of its bit locations a system parity bit corresponding to the parity of the data bits stored in the corresponding locations of the M−1 integrated circuits; and means for generating a second level system parity signal at the output of the logic gate of said Mth integrated circuit including:

means connecting the output of the logic gate of the $i^{th}$ one of said M integrated circuits to the other input of the logic gate of the ($i^{th}$+1) of said M integrated circuits, as i varies between 1 and (M−1).

6. The combination as claimed in claim 5 wherein each one of said M IC's further includes a second logic gate having two inputs and an output; wherein said first and second level parity signals are applied to said two inputs of said second logic gate for producing a control signal at its output having a first value when the two parity signals indicate the presence of errors and having a second value when only one or more of the parity signals indicate the presence of errors.

7. The combination as claimed in claim 6 wherein each one of said M IC's further includes a third logic gate having two inputs and an output, wherein said control signal produced on an IC is applied to one input of said third logic gate and wherein said selected particular data bit is applied to the other input of said third logic gate for producing a signal at the output of said third logic gate having the same binary value as the input data bit of said control signal has said second value and having the complementary binary value as the input data bit if said control signal has said first value.

8. The combination as claimed in claim 5 wherein each one of said M integrated circuits is identical to any other one of said M integrated circuits.

9. The combination as claimed in claim 5 wherein said means connecting the output of the logic gate of the ith one of said M integrated circuits to the other input of the logic gate of the (ith+1) of said M integrated circuits is a single wire connection.

10. In a memory system comprised of M integrated circuits IC's, where M−1 of the IC's are for storing data bits and the Mth IC is for storing system parity bits and where each IC contains a random access memory (RAM) array of R·C bit locations organized into W "internal" words of L bits each where W·L is equal to R·C, and where each IC includes means for performing a parity check on a selected internal word for producing a first parity signal indicative of whether the parity of the selected internal word is correct and where each IC includes means for reading-out a data bit contained in a selected internal word; and where the data bits read-out from the M-1 of the M IC's are checked for parity versus a system parity bit stored in the Mth IC, improved error detection and correction circuitry comprising:

first means on each IC responsive to the data bit read-out from that chip and to the output of a like means from another IC of the system for producing a signal indicative of the parity of the two signals;

second means on each IC responsive to the internally generated first parity signal and to a system parity signal generated at the output of said first means of the Mth chip for producing at its output a control signal having a first binary value of said first parity signal and said system parity signal indicate the presence of parity errors; and third means on each IC responsive to the data bit read-out from its IC and to the control signal produced on its IC for outputting a data bit having a value which is complementary to the value of the data bit read-out of that chip when said control signal has said first binary value.

* * * * *

UNITED STATES PATENT AND TRADEMARK OFFICE
CERTIFICATE OF CORRECTION

PATENT NO. : 4,450,562
DATED : May 22, 1984
INVENTOR(S) : Ihor T. Wacyk et al.

It is certified that error appears in the above-identified patent and that said Letters Patent is hereby corrected as shown below:

```
Col. 1, line 25, change "or" to - - - of - - -.
Col. 1, line 41, change "and" (3rd occurrence) to - - the - -.
Col. 3, line 25, change "M1" (2nd occurrence) to - - M8 - -.
Col. 4, line 25, change "column" to - - - columns - - -.
Col. 4, line 64, change "on" to - - - one - - -.
Col. 5, line 59, change "legand" to - - - legend - - -.
Col. 5, line 60, after "logical" insert - - - product - - -.
Col. 6, line 21, change "input" to - - - output - - -.
Col. 9, line 5, after "penalty" insert a period.
Col. 10, line 46, change "of" to - - - for - - -.
```

Signed and Sealed this

Twenty-seventh Day of November 1984

[SEAL]

Attest:

GERALD J. MOSSINGHOFF

Attesting Officer

Commissioner of Patents and Trademarks